United States Patent
Boss et al.

(10) Patent No.: US 7,778,769 B2
(45) Date of Patent: Aug. 17, 2010

(54) METHOD AND SYSTEM FOR CALCULATING LEAST-COST ROUTES BASED ON HISTORICAL FUEL EFFICIENCY, STREET MAPPING AND LOCATION BASED SERVICES

(75) Inventors: Gregory Jensen Boss, American Fork, UT (US); Rick Allen Hamilton, II, Charlottesville, VA (US); Michael Jack Martine, Chapel Hill, NC (US); Kevin C. McConnell, Austin, TX (US); John Williams Miller, Suwanee, GA (US)

(73) Assignee: International Business Machines Corporation, Armonk, NY (US)

( * ) Notice: Subject to any disclaimer, the term of this patent is extended or adjusted under 35 U.S.C. 154(b) by 933 days.

(21) Appl. No.: 11/563,418

(22) Filed: Nov. 27, 2006

(65) Prior Publication Data
US 2008/0125958 A1 May 29, 2008

(51) Int. Cl.
*G06F 19/00* (2006.01)
(52) U.S. Cl. ........................................ 701/123; 701/36
(58) Field of Classification Search ................. 701/123, 701/29–36, 213, 200–209
See application file for complete search history.

(56) References Cited

U.S. PATENT DOCUMENTS

| | | | |
|---|---|---|---|
| 5,148,702 | A | 9/1992 | Gulick, Jr. |
| 6,078,850 | A | 6/2000 | Kane et al. |
| 6,360,158 | B1 | 3/2002 | Hanawa et al. |
| 6,691,025 | B2 | 2/2004 | Reimer |
| 6,950,740 | B1 | 9/2005 | Cook |
| 7,421,321 | B2 * | 9/2008 | Breed et al. ................. 701/29 |
| 7,532,974 | B2 * | 5/2009 | Sato et al. ................... 701/123 |
| 7,663,502 | B2 * | 2/2010 | Breed .................... 340/825.72 |
| 2004/0078141 | A1 | 4/2004 | Kittell |
| 2004/0181358 | A1 | 9/2004 | Youngquist |

OTHER PUBLICATIONS

A Fuel-Consumption Gauge for Your GM Car Real-timeData from Your Engine Computer, AVR 2004 Design Contest—Entry A3805. [online]. Retrieved from the Internet Jun. 30, 2004. <URL: http://www.circuitcellar.com/avr2004/wabstracts/A3805abstract.pdf>; 5 pages.
The MPG Meter—Instant Mile per Gallon indication! Copyright 2002, Porcine Associates; [online]. <URL: http://www.porcine.com/gps/mpg/mpg.html >. 2 pages.
Rising Fuel Costs Add New Pressure on the Bottom Line; Vendors Seek Solutions. [online]. Posted Apr. 2, 2009. Retrieved from the Internet Sep. 16, 2009. <URL: http://www.AMonline.com/publication/article.jsp?id=14548 >. 5 pages.
Maximizing Gas Mileage in a Toyota Prius; Published by Rattling the Kettle. [online]. Retrieved from the Internet Sep. 28, 2009; < URL: http://rattlingthekettle.com/prius-main/ >. 4 pages.

* cited by examiner

*Primary Examiner*—Richard M. Camby
(74) *Attorney, Agent, or Firm*—Schmeiser, Olsen & Watts; William H. Steinberg

(57) ABSTRACT

This disclosure outlines a method, which enables a vehicle driver to achieve increased fuel efficiency by implementing least-cost route planning based on terrain data and derived from advanced mapping, logging and location based services. Actual fuel efficiency is recorded and correlated by vehicle conditions, time of day and date, and then referenced to achieve the most accurate least-cost route plan for the intended destination.

20 Claims, 5 Drawing Sheets

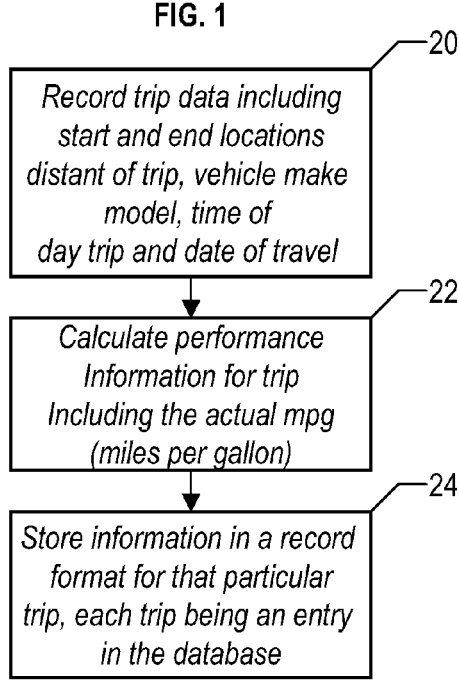

| Unique ID | Start Location | End Location | Distance | Path Taken | Start End | End Time | Day of Travel |
|---|---|---|---|---|---|---|---|
| 10 | 2 Deg 14.55 min | 13 deg 2.243 min | 25 miles | waypoints/route | 2:03pm, 1/4/06 | 3:03pm, 1/5/06 | Monday |
| 11 | 2 deg 14.55 min | 14 deg 2.243 min | 25 miles | waypoints/route | 2:03pm, 1/4/06 | 3:03pm, 1/4/06 | Monday |
| 12 | 2 deg 14.55 min | 18 deg 2.243 min | 33 miles | waypoints/route | 2:03pm, 1/4/06 | 9:30am, 1/5/06 | Monday |
| 13 | 2 deg 14.55 min | 1 deg 2.243 min | 34 miles | waypoints/route | 2:03pm, 1/4/06 | 9:30am, 1/5/06 | Monday |

FIG. 1

20 — Record trip data including start and end locations distant of trip, vehicle make model, time of day trip and date of travel 22 — Calculate performance Information for trip Including the actual mpg (miles per gallon)

24 — Store information in a record format for that particular trip, each trip being an entry in the database

FIG. 2

| Trip ID | Start Location | End Location | Distance | Time | Vehicle | Terrain | Road | Time (Day) | Date |
|---|---|---|---|---|---|---|---|---|---|
| 1 | 2d 14m | 13d 22m | 25 miles | 30m | ABC | Flat | 0 | AM | 1/5/06 |
| 2 | 2d 14m | 14d 22m | 30 miles | 37m | ABC | Flat | 2 | AM | 1/10/06 |
| 3 | 2d 14m | 13d 22m | 25 miles | 33m | ABC | Flat | 0 | PM | 6/12/06 |
| 4 | 2d 14m | 13d 22m | 25 miles | 35m | DEF | Flat | 0 | PM | 2/13/06 |
| 5 | 3d 14m | 13d 22m | 25 miles | 30m | XYZ | Mixed | 0 | AM | 4/7/06 |
| 6 | 2d 13m | 14d 21m | 28 miles | 40m | ABC | Mixed | 1 | AM | 1/8/06 |
| 7 | 2d 15m | 13d 22m | 28 miles | 35m | DEF | Flat | 0 | PM | 8/10/06 |
| 8 | 2d 14m | 13d 23m | 27 miles | 32m | ABC | Mixed | 0 | AM | 1/14/06 |
| 9 | 2d 14m | 12d 24m | 33miles | 45m | XYZ | Hills | 2 | AM | 9/10/06 |
| 10 | 2d 14m | 13d 22m | 25 miles | 35m | XYZ | Mixed | 0 | PM | 3/3/06 |
| 11 | 4d 15m | 15d 22m | 35 miles | 44m | ABC | Mixed | 1 | AM | 1/3/06 |
| 12 | 2d 14m | 14d 22m | 30 miles | 40m | DEF | Flat | 0 | AM | 1/16/06 |
|  |  |  |  |  |  |  |  |  |  |
| N | 3d 15m | 3d 15m | 37 miles | 47m | ABC | Hills | 0 | PM | 1/15/06 |

FIG. 5a

| Trip ID | Start Location | End Location | Distance | Time | Vehicle | Terrain | Road | Time (Day) | Date |
|---|---|---|---|---|---|---|---|---|---|
| 1 | 2d 14m | 13d 22m | 25 miles | 30m | ABC | Flat | 0 | AM | 1/5/06 |
| 2 | 2d 14m | 13d 22m | 25 miles | 33m | ABC | Flat | 0 | PM | 6/12/06 |
| 3 | 2d 14m | 13d 22m | 25 miles | 35m | DEF | Flat | 0 | PM | 2/13/06 |
| 10 | 2d 14m | 13d 22m | 25 miles | 35m | XYZ | Mixed | 0 | PM | 3/3/06 |

FIG. 5b

| Trip ID | Start Location | End Location | Distance | Time | Vehicle | Terrain | Road | Time (Day) | Date |
|---|---|---|---|---|---|---|---|---|---|
| 1 | 2d 14m | 13d 22m | 25 miles | 30m | ABC | Flat | 0 | AM | 1/5/06 |
| 2 | 2d 14m | 13d 22m | 25 miles | 33m | ABC | Flat | 0 | PM | 6/12/06 |

FIG. 5c

METHOD AND SYSTEM FOR CALCULATING LEAST-COST ROUTES BASED ON HISTORICAL FUEL EFFICIENCY, STREET MAPPING AND LOCATION BASED SERVICES

FIELD OF THE INVENTION

This invention relates to a method for calculating optimum fuel efficiency routes and in particular to a method for calculating least cost fuel usage routes between locations based on a plurality of data inputs. These data inputs are input into an algorithm that applies simplex optimization techniques to generate a least cost fuel usage for a particular trip.

BACKGROUND OF THE INVENTION

Today, there are numerous route planning techniques to assist persons mapping out the route for a potential trip. These techniques examine various routes that are available between the starting point and the destination point. A traveler can get information about the length of the trip in terms of both mileage and time. Some maps even have information about the terrain of the routes such as whether the terrain is hilly or flat. The information concerning the terrain of a route could be of particular importance to one who is towing a load.

Although many of the present day travel aid resources provide information about the routes, times and distances, none of the present day travel aids take into account duel efficiency as a variable to be considered in planning a trip. The present day techniques are totally limited to the realm of fastest time, shortest distance, scenic routes, and etcetera. Even though these variables are important to many travelers, an ever-increasing consideration for travelers is the cost of fuel. Furthermore, as fuel prices demonstrate extreme volatility, there is an even more timely need for fuel-efficient strategies to counter rising costs. With the ever-increasing cost of gas, travelers are looking for ways to maximize their miles per gallon. This invention thus defines a method to increase miles per gallon using GPS, topographical information historical data, and vehicle correction.

Today, there are no known solutions to address the problem of calculating the fuel efficiency for a specific trip. Many GPS route planning solutions exist in the market but as mentioned, they are all limited to route planning techniques that revolve around "Fastest Time", "Shortest Distance", "Most Use of Freeways", and "Scenic" route techniques and algorithms.

There remains a need for a method that can calculate the fuel efficiency of trip where this fuel efficiency calculation is based on a plurality of variables that can include the length of the trip, the terrain of the route that will be taken, and the type of vehicle the travelers will be using.

SUMMARY OF THE INVENTION

The present invention describes a method and system for a driver to maximize the fuel efficiency (measured in miles per gallon or kilometers per liter) to most closely meet the economic goals of the driver. The system can use GPS technology integrated with historical fuel efficiency data to determine the "Least-Cost Route" plan. Optionally, topographic maps could be used when statistically accurate historical data is not available. The output is a planned route based upon fuel efficiency, allowing the driver or operator of a vehicle to make the most economical route planning decisions. In addition to viewing possible routes based on fuel efficiency, this method and program product of the present invention allows a user to assign a value (in dollars) to time. This allows a route, which may consume less fuel but takes more time to be appropriately compared to another route which consumes more fuel takes less time.

The system will determine the best of all calculated routes based on the vehicles estimated MPG, historical data and efficiency in traversing various terrains. In one example, a vehicle towing a heavy trailer would consume fewer MPG if it took a longer but more flat route while the same vehicle without the extra weight would achieve better MPG by going a shorter route over more hilly terrain. This method would produce the best MPG rating for a given trip. With this new system in place, the driver will be able to query a mapping software program product that is based on optimal gas mileage rather than on speed or distance alone.

The major components used in this system of the present invention are:
- A map and routing software program product that presents estimates fuel consumption and related costs with each planned route.
- A GPS (optionally with topographical data overlaid on street map data and optionally road speed limits).
- A computer that is able to calculate the gas consumption based on the known terrain over multiple optional routes
- A memory storage for containing historical data of prior trips.

In the method of the present invention, the traveler would enter a variety of information into the system that relates to the trip. This information could include the start and end points for the trip, the type of vehicle that will be used, the desirable amount of time the traveler wants to spend in route to the destination, and the date and time day the traveler would be traveling. In addition to this information entered by the traveler, the system can search a historical database for similar trips to the one that the traveler will take and retrieve additional information about this planned trip. The additional information could include data about the terrain of the various routes between the start and end points of the trip. The accumulated information would be fed into an optimization algorithm that would calculate the most fuel efficient route for a trip between the start and end points of the trip for the particular information supplied by the traveler. After the traveler completes the trip, information about the completed trip can be supplied to the historical database for reference by future travelers that may have trip along the same or similar routes as the current traveler.

BRIEF DESCRIPTION OF THE DRAWINGS

FIG. 1 is an illustration of multiple entries in a database of containing information about prior trips that can be used to determine the optimal fuel usage for a proposed trip.

FIG. 2 is a flow diagram of the steps for building a database containing information about prior trips.

FIG. 5a is a view of a typical historical database in conjunction with the present invention.

FIG. 5b is a selection of database entries that related to characteristics of the presently proposed trip.

FIG. 5c is a selection of database entries that are closely related to the characteristics of the presently proposed trip.

DETAILED DESCRIPTION OF THE INVENTION

Simplex Optimization

Figure 3:
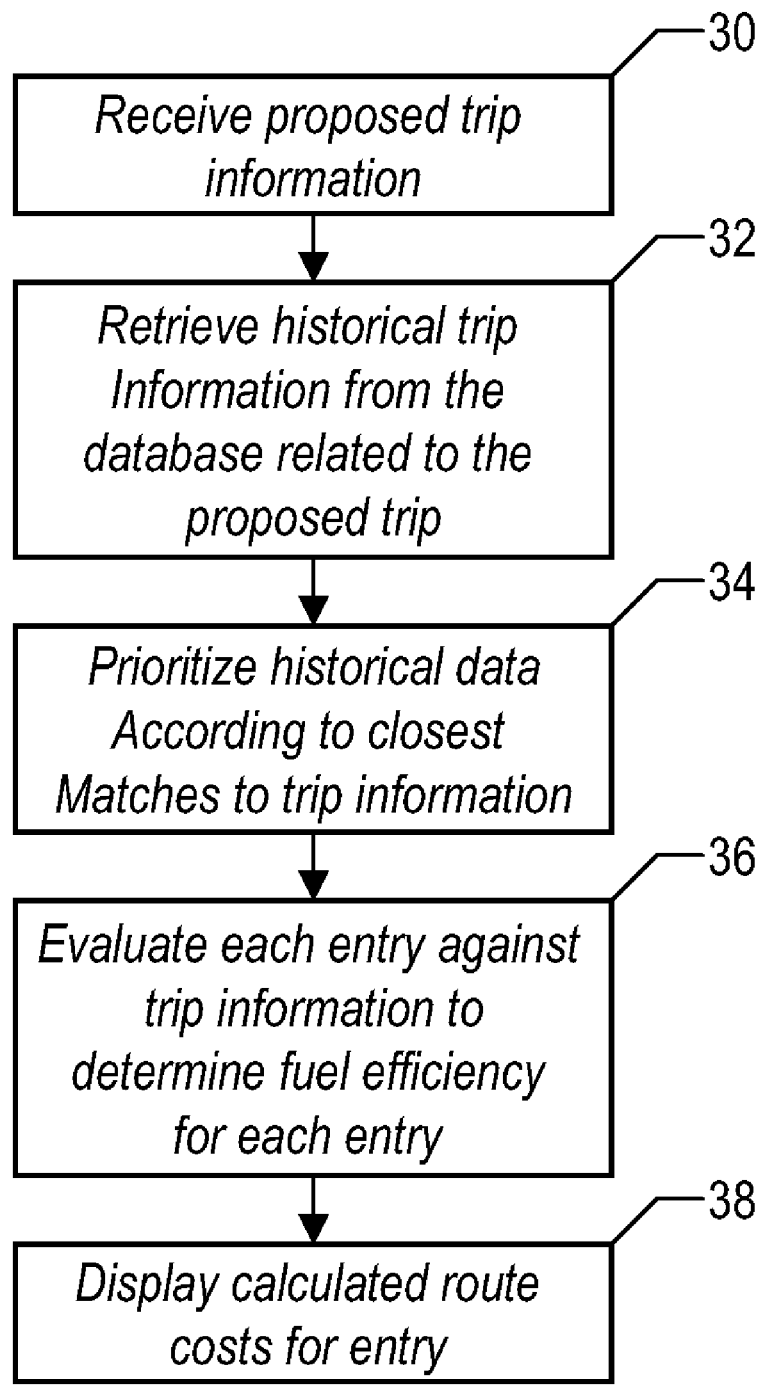
FIG. 3 is a flow diagram of the general steps in the implementation of the method of the present invention.

One way of optimizing a process or system is by non-systematic "trial and error" and another way is by changing one control variable at a time while holding the rest constant. Both of these methods are time-consuming and are ineffective at taking into account dynamic changes in the process or system, for example, changes in the composition of the fuel in a combustion process or system. In 1962 an efficient sequential optimization method called the basic simplex method was presented by Spendley et al in an article called "Sequential Application of Simplex Designs in Optimization and Evolutionary Operation" in Technometrics Vol. 4, No. 4, November 1962, pages 441-461. The basic simplex method is based on an initial set of k+1 trials where k is the number of variables. This number of trials corresponds to the minimum necessary for defining a direction of improved response and is an economical and timesaving way to start an optimization project.

The present invention implements in a preferred embodiment a simplex optimization algorithm to calculate a travel route based on optimal filet consumption instead of the conventional parameters of distance between start and end points and travel time.

The simplex methods are based on an initial design of k+1 trials, where k is the number of variables. A k+1 geometric figure in a k-dimensional space is called a simplex. The corners of this figure are called vertices. With two variables the first simplex design is based on three trials, for three variables it is four trials, etc. This number of trials is also the minimum for defining a direction of improvement. Therefore, it is a timesaving and economical way to start an optimization project.

After the initial trials the simplex process is sequential, with the addition and evaluation of one new trial at a time. The simplex searches systematically for the best levels of the control variables. The optimization process ends when the optimization objective is reached or when the responses cannot be improved further.

The basic simplex method is easy to understand and apply. The optimization begins with the initial trials. The trial conditions are spread out efficiently. The number of initial trials is equal to the number of control variables plus one. These initial trials form the first simplex. The shapes of the simplex in a one, a two and a three variable search space, are a line, a triangle or a tetrahedron. A geometric interpretation is difficult with more variables, but the basic mathematical approach outlined below can handle the search for optimum conditions.

The basic simplex algorithm consists of a few rules:

The first rule is to reject the trial with the least favorable response value in the current simplex. A new set of control variable levels is calculated, by reflection into the control variable space opposite the undesirable result. This new trial replaces the least favorable trial in the simplex. This leads to a new least favorable response in the simplex that, in turn, leads to another new trial, and so on. At each step you move away from the least favorable conditions. By that the simplex will move steadily towards more favorable conditions.

The second rule is never to return to control variable levels that have just been rejected. The calculated reflection in the control variables can also produce a least favorable result. Without this second rule the simplex would just oscillate between the two control variable levels. Choosing the second least favorable condition and moving away from it nicely avoid this problem.

Besides the two main rules, two more rules are also used. Trials retained in the simplex for a specified number of steps are reevaluated. The reevaluation rule avoids the simplex to be stuck around a false favorable response. Calculated trials outside the effective boundaries of the control variables are not made. Instead a very unfavorable response is applied, forcing the simplex to move away from the boundary.

The calculations in the MultiSimplex basic simplex algorithm are outlined in the flow chart. For each simplex the following labels are used: W for the least favorable trial or the trial being rejected, B for the most favorable trial and $N_w$ for the second least favorable trial (i.e. next-to-the worst).

The simplex method leads systematically to the optimum levels for the control variables. The simplex method finds the optimum response with fewer trials than the non-systematic approaches or the method of changing one variable at a time. The simplex method is also easily automated. Further research in the field of optimization has led to an improved simplex method called the modified simplex method. This is described in an article called "A simplex method for function minimization" in "Computer Journal", Vol. 7, 1965, pages 308-313, by Nelder and Mead.

The modified simplex algorithm is a variable size simplex in which the simplex expands in the direction of more favorable conditions and contracts if a move was taken in the direction of less favorable conditions. The expansion and contraction enable the simplex to accelerate along a successful track of improvement and to home in on the optimum conditions. The modified simplex therefore usually reaches the optimum region more quickly than the basic simplex method and it can pinpoint the optimum levels more closely.

A number of other modifications of the Nelder and Mead method have been presented. Several of those other modified methods are described in an article called "Reflections on the modified simplex II" in "Talanta", Vol. 32, No. 8B, pages 723-734, by Betteridge and Wade, and in the textbook "Sequential simplex optimization", CRC Press, 1991, ISBN 0-8493-5894-9, by Walters, Parker, Morgan and Deming. Some examples of those other modified methods are the weighted centroid simplex, the super-modified simplex, the controlled weighted simplex, and the composite modified simplex.

In addition to simplex and modified simplex algorithms there are other optimization algorithms such as genetic algorithms and simulated annealing algorithms where each iteration can be described as a move from one polyhedron or hyperpolyhedron to another one.

System Components

This system includes a computing device with permanent memory storage and optionally wireless or network capabilities. Every time a driver completes a trip of any length and from any one location to any other location, the actual mpg are recorded. Correlated data are also stored with the recorded MPG including the vehicle make and model and any distinguishing characteristics of the trip. Additionally, the time of day and the date of the trip are recorded. This information is stored in persistent storage so that it can be called up and evaluated at a later time.

FIG. 1 is an illustration of a permanent memory storage with historical information about prior trips by the driver and other driers in the system. This memory storage could be a database in which these types of records are kept. Each trip is shown as an entry in the database. For each trip, a various pieces of data about the trip are stored in different fields. The entries in this database have fields that identify the each trip. Other fields indicate the start location and end locations of the trip. The entry indicates fields for the distance of the trip, the particular path or route taken along with the start time, end time and day and date of the trip. The information shown in the database records of FIG. 1 are only illustrative of the kinds of information that can be used to describe a trip. Other information about the trip can include the make and model of the trip vehicle, the weather and road conditions at the particular time of the trip, the type of road for a particular route. For example, one route could be a freeway with multiple lanes in each direction and bypasses to reduce the number of cities or towns through which the route passes. Another route may be a state highway that does not have bypasses. In addition, the number of lanes in each direction could differ from the freeway. Furthermore, some fields in the database may summation fields. For example, instead of having start and stop times, there could be a field listing the duration of the trip. This duration could be calculated from the known start and stop times. However, for this calculation, it would still be necessary to capture the start and stop times. Along with the permanent memory is a vehicle memory that stores temporarily stores information about a current trip and sends that information to the permanent memory at the completion of the trip.

A mapping and routing software program product estimates fuel consumption and related costs associated with each planned route. This software product performs that optimization techniques that generate the optimal routes based on fuel efficiency. This program uses combination of historical data and custom inputs to calculate these fuel efficiency estimates.

A Global Positioning System (UPS) is an optional component of this system. This GPS provides topographical data overlaid on street map data. The GPS can provide information such as road terrain. This information may be helpful in instances where the trip is along a route in which the database does not have any information.

The system also incorporates a computer that is able to calculate the gas consumption based on the known terrain over multiple optional routes. This computer could contain the software program product used to calculate the fuel consumption estimates. This computer could also be a computing system or network, which could send information from one location to another location.

Related to the process of storing historical miles per gallon (MPG) and related information on a per trip basis is the process of sending this historical data from the vehicle's persistent memory to public storage on the internet, presumably via a web service model. This data would likely be sent anonymously. The data from thousands of vehicles who participate in this optional pooling of data will benefit from more accurate statistical data since there exists many thousands of the same make and model of vehicles, and thus takes advantage of the much high likelihood that the planned trip has already been traversed by one or more vehicles of the same make and model.

FIG. 2 is a flow diagram of the steps for building a database in a permanent memory that contains information about prior trips. The database can contain an unlimited number of trips between various destinations. The configuration of the database can also vary from just a straight list of trips to a hierarchy of trips. This hierarchy can a division of trips based on different lengths. For example, all trips up to fifty miles in length could be in one section while trips between fifty to 100 miles could be in another section of the database. When it is desirable to search the database, a search would only be of trips in the range of the currently proposed trip.

In Figure, the driver would activate a program in the vehicle that would accumulate the trip data. In step 20, the program would record information about the activities of the trip. These activities would include the start and end locations of the trip, the distance of the trip, the day and date of the trip, the actual time of day, and the make and model of the vehicle. In step 22, the program would calculate and record vehicle performance information such the actual miles per gallon of the vehicle at the end of the trip. This step 22 can also record vehicle condition data such as the external temperature during the trip and whether the driver used air conditioner, the average speed of the vehicle or other activities that could impact the performance of the vehicle. At the completion of the trip, the program performs various calculations related to the trip and in step 24 stores or transmits this information to permanent storage facility or database. This transfer of information can be via a wireless communication link between the vehicle and the permanent storage location.

FIG. 3 is a flow diagram of the general steps in the implementation of the method of the present invention. In this method, the driver would initially input trip parameters such as the start and end locations, similar to other conventional methods. However, the driver would input the make and model of the car and the estimated date and time of the proposed trip. In step 30, this method/program would receive this proposed trip information. With this initial information, the program in step 32 retrieves historical information from the database. This retrieval step can be a retrieval of all trip entries that match these particular start and end locations or start and end locations in close proximity of the locations for this particular trip. Step 34 would prioritize the historical data entries according the entries that are the closest matches to the proposed trip. Referring back to the database records of FIG. 1, each field can be compared with information for the proposed trip. The entries with the most fields that match the proposed trip would be ranked higher and would be considered stronger sources of information when calculating the fuel consumption estimates for the proposed trip. Step 36 uses the submitted information for the proposed trip and the historical information for prior but similar trips to calculate the fuel consumption for the proposed trip using optimization techniques. Step 38 displays the results of these calculations.

Figure 4:
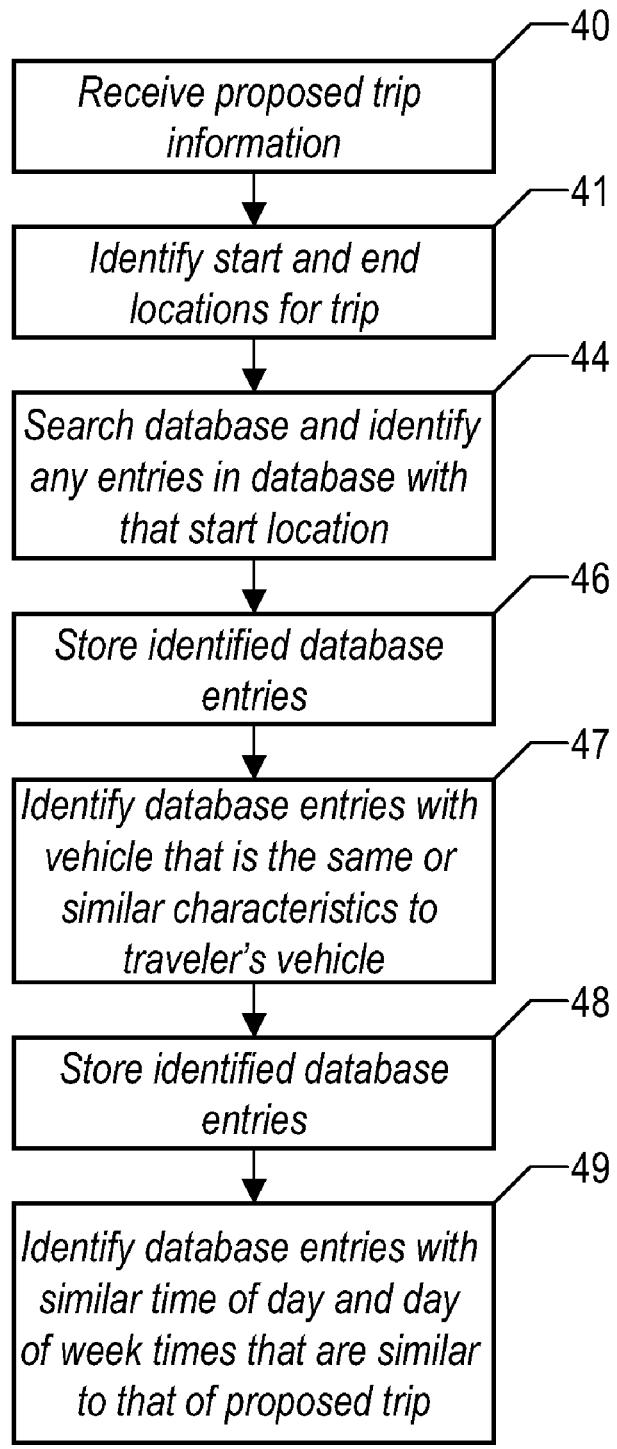
FIG. 4 is a flow diagram of the steps involved in the gathering of historical in response to a proposed trip inquiry.

FIG. 4 is a flow diagram of the steps involved in the gathering of historical in response to a proposed trip inquiry. This historical data gathering activity is shown in step 32 of FIG. 3. In step 40, this method receives the information for the proposed trip. At the beginning of a trip, the following information is entered into the system: starting location (possibly pre-entered from OPS data), destination and waypoints, and optionally any driver preferences including a dollar value on time. After the system receives the start-up information, it calculates the most cost efficient route to take. The system may determine that it is better to take a longer route that is flat versus a shorter route through the mountains. The system will present the options and the driver may select a route, based on cost-effectiveness, expected transit time or other criteria.

Next, step 41 identifies the start and end locations for the trip. At this point, step 44 performs a search of the historical database for records that match the current start and end locations. The computer will begin by sorting the values in the database by start location and identifying any records that match the current driver's start position within a specified degree of accuracy. This accuracy preference would be a default setting unless changed by the end user. The specified degree could be any unit of measure but most likely would be a percentage of the overall distance traveled, such that the variance of the start location in the database and the actual start location are small in comparison to the length of the trip. This will allow for an accurate prediction on the estimated Least-Cost Router plan. Take for example Driver A, who specifies a 1% variance allowance and started a trip in his driveway, and wanted to travel 30 miles to a relative's house. If an entry existed in the db for the same destination but a slightly different start location the system would accept that row in the table as long as the actual start location was less than 0.3 miles from the recorded location (variance/distance).

In a specific implementation of this step, the search would be comparison of the current start and end locations with these corresponding fields of the database entries. The matches could also be for start and end locations that are not the same of are similar. For example locations that are within 2 miles of the start or end locations could be viewed as matches as well as the exact locations. Depending on the configuration of the database, there can be a step that calculates the trip distance and only searches the sections of the database that contain trips with distances similar to the distance of the currently proposed trip. This approach would eliminate the need to search the entire database for these records. Once step 44 identifies all of the records, step 46 stores these records in a storage location. This storage location can be a temporary location.

Step 47 then performs a second search of the retrieved records based on the identity of the vehicle used in the trip. Once start and end locations for the trip are filtered from the database, those values are again separated by vehicle type and those vehicles that match the current driver's vehicle make, model and engine type are given additional weight by incrementing the weight column of the database. This will cause those entries to bubble to the top of the list. Similar vehicles that aren't exact match but are very similar in characteristics affecting fuel efficiency are given additional weight but not as much weight as the exact matches.

This search is similar to the search of step 44, but the examination of each record would be the field that identifies the vehicle. Step 48 then stores these identified records. Again this storage could be in a temporary storage location.

Step 49 can perform an additional search of the records generated by the search of step 47. In this search, the intent is to identify trips in which the travel times were the same or similar to those times of the currently proposed trip. Similar to the Vehicle Matching, additional weights are applied to those rows in the db that have similar characteristics to the driver's proposed start and end times and the day of the week, allowing for more accurate historical analysis. Take for example, the driver going from his house to his work location at 8:00 am and again at 2:00 pm. The resulting MPG for each of these two trips could be dramatically different due to rush hour conditions. For this reason, a correlation between MPG for any given trip and the time of day and day of week will be taken into consideration. The amount of weight or the multiplier used for the weight setting here and in the Vehicular Matching section can be changed to any values desired.

The data in the day of travel and time of day fields would be compared to those entered in the current trip. This search would produce another list of database base entries. At this point, the list of database entries should contain a substantial number of characteristics that are the same or similar to the currently proposed trip. In this case, the historical data provides a more accurate indication of the final characteristics of the currently proposed trip. At this point, the route planner will have a prioritized list of the closest matching historical data of similar start and end destinations. This information would also provide reliable information for the optimization step.

FIGS. 5*a*, 5*b* and 5*c* illustrate the searching sequences and results from the searches described in FIG. 4. Referring first to FIG. 5*a*, shown is an example of a database that stores historical data of prior trips. Each entry is numbered with a trip identity. In addition, there are other fields that contain information about each trip. FIG. 5*a* can also be an example of a segment of the database arranged by trips with similar distances. This segment of the database can be for trips that range between 20 and 40 miles. By arranging the database in this manner, search time could be saved by not needing to search the entire list of entries in the database.

FIG. 5*b* is set of entries that resulted from a search of the database. This search was based on trips with the same start and end locations as a currently proposed trip. As previously described in FIG. 4, step 44, entries with the same or similar start and end locations are identified in the database. FIG. 5*c* is a set of inquires the resulted from a search of the entries in FIG. 5*b*. This time the search was based on the same type of vehicle that the driver of the currently proposed trip will use. This search produced two entries with features that are similar to the currently proposed trip.

Figure 6:
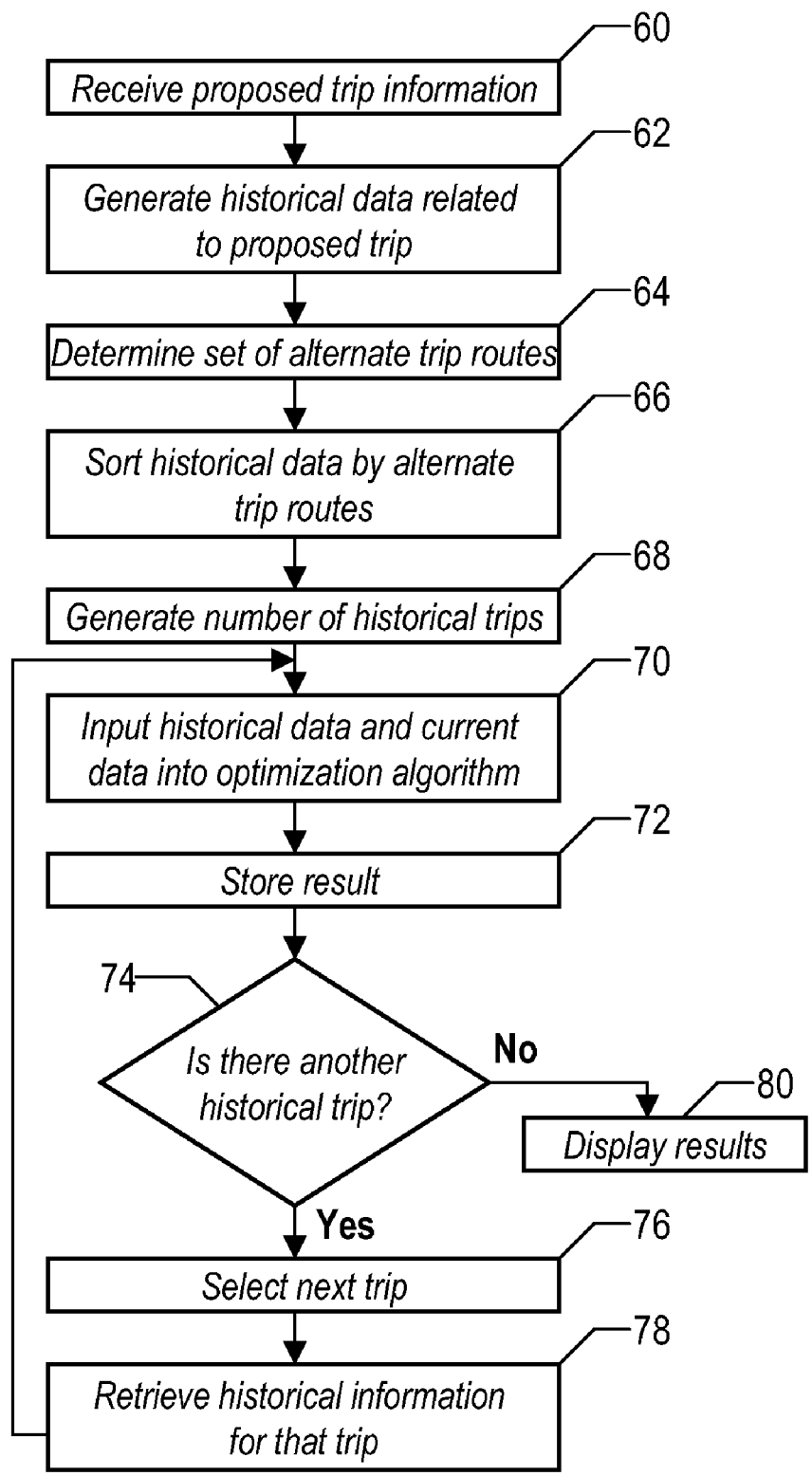
FIG. 6 is a detailed flow diagram of the steps in the implantation of the method of the present invention.

FIG. 6 shows a more detailed flow diagram of the implementation of the method of the present invention. Initially, step 60 receives the proposed information for the trip as described in step 40. Step 62 generates the historical data related to the proposed trip. This step includes the actions described in FIG. 4. Step 64 generates a set of alternate routes between the start and end trip locations. The alternate routes could be the same route taken at different times as shown in FIG. 5*c* or they could be different roads/routes between the start and end locations. The same route at different times can be important because the varying of traffic patterns during different times of the day. Step 66, which is an optional step, sorts the data by alternate routes. This sorting process can be by alternate physical routes. Step 68 generates a number of historical trips that will be inputs into the optimization algorithm.

Step 70 uses the historical data and current trip data to generate fuel consumption for the various alternate routes. The process will use the top X entries from the list (X being a variable factor) and then compare for each one 1) the time it took to complete that trip, 2) the route taken, and 3) the MPG of fuel efficiency. A user's preference will store the current cost per gallon of gasoline (or other fuel used by that vehicle) and the value in dollars that that person places on time—typically expressed in dollars per hour.

The various calculations from step 70 are stored in step 72 in a memory location until the completion of the process of step 70. After the storing of the information for one of the alternate routes of step 68, there is a determination in step 74 of whether there are additional routes to be used in the fuel consumption calculations. If there are additional alternate routes, step 76 selects the next route. The information for the newly selected route is retrieved in step 78 and the process returns to the optimization step 70. At the completion of step 70 for all alternate routes, the store information from these calculations is displayed to the driver.

The following example illustrates the results of a fuel consumption calculation using the method of the present invention. Take for example, Driver A who values his own time at $30/hour and who specifies that gasoline cost roughly $2.50 per gallon. In this case, the cost of routes identified as 10 and 11 are Route 10 (1.5 hours*$15)+($2.5/gal*(25 miles/33 miles/gal))=$24.39

Route 11 (1 hour*$15)+($2.5/gal)*(25 miles/23 miles/gal))=$17.72

In the above example, it can be evaluated that the Least-Cost Route when factoring in a person's dollar value on time is the route associated with route 11. In this scenario, route 11 is less efficient due to terrain and other conditions and generates only 23 MPG on average; however, it get the driver to his destination in ⅓ the time and thus is worth the added cost. Route 10 showed a much more fuel efficient route but because it took 30 minutes longer it is considered more expensive. The reverse conclusion would be drawn if the driver placed $0 value on his time. The driver's time can be an important factor for example if the driver works or charges by time such as by the hour. The In this case, it would be much cheaper to recommend the route associated with route 10 as reflected in the following formula:

Route 10 (1.5 hours*$0)+($2.5/gal*(25 miles/33 miles/gal))=$1.89

Route 11 (1 hour*$0)+($2.5/gal*(25 miles/23 miles/gal))=$2.72

In this case the route associated with route 10 would result in a 30% savings in cost. With this information, a driver can make decisions about trips costs based on a calculation of fuel usage and not just time and distance of a potential trip.

It is important to note that while the present invention has been described in the context of a fully functioning data processing system, those skilled in the art will appreciate that the processes of the present invention are capable of being distributed in the form of instructions in a computer readable medium and a variety of other forms, regardless of the particular type of medium used to carry out the distribution. Examples of computer readable media include media such as EPROM, ROM, tape, paper, floppy disc, hard disk drive, RAM, and CD-ROMs and transmission-type of media, such as digital and analog communications links.

We claim:

1. A method for calculating least-cost travel routes based on fuel efficiency and current traveling conditions comprising the steps of:
   receiving information about a proposed trip;
   retrieving historical trip data about previous trips having the same or similar characteristics to the proposed trip;
   prioritizing the retrieved historical data according to historical trips that more closely matched the information of the proposed trip;
   calculating an estimated fuel efficiency for a proposed trip based on current trip information and information from a historical trip; and
   conveying this estimated fuel efficiency to a driver.

2. The method for calculating least-cost travel routes as described in claim 1 further comprising before said retrieving historical trip data step, the step of generating a database of historical data about a plurality of trips.

3. The method for calculating least-cost travel routes as described in claim 2 wherein said database generating step further comprises the steps of:
   recording trip information for a particular trip at a particular vehicle used in the trip, this information including start and end locations of the trip, distance of the trip, vehicle make and model, time of day and date of the trip;
   calculating performance information for the particular trip, the calculated information including the actual miles per gallon of the vehicle during the particular trip; and
   storing recorded and calculated information about the particular trip in a database location, the information for this particular trip forming one entry in the database.

4. The method for calculating least-cost travel routes as described in claim 3 wherein in said trip recording, the distance of the trip is calculated from start and end times for the particular trip.

5. The method for calculating least-cost travel routes as described in claim 1 wherein said prioritizing step further comprises the steps of:
   identifying start and end locations for a proposed trip;
   searching a database of historical trip entries for entries having the same or similar start and end locations as the proposed trip;
   storing all historical trip entries having the same or similar start and end locations as the proposed trip;
   identifying from the stored database entries having the same or similar start and end locations as the proposed trip, entries with the same or similar vehicle type as a vehicle to be used in the proposed trip;
   storing the identified entries with the same or similar vehicle type as a vehicle to be used in the proposed trip; and
   identifying from the stored identified entries with the same or similar vehicle type as a vehicle to be used in the proposed trip, entries with the same or similar travel times.

6. The method for calculating least-cost travel routes as described in claim 1 wherein said prioritizing step further comprises the steps of:
   retrieving trips from the database that have the same starting location and destination location of the proposed trip;
   determining two or more alternate trip routes between the trip starting location and the trip destination location from the retrieved data; and
   sorting retrieved historical trip data by alternate trip routes.

7. The method for calculating least-cost travel routes as described in claim 6 wherein said sorting step further comprises the steps of:
   examining a historical trip retrieved from the database;
   matching the retrieved with one of the alternate trip routes;
   storing that record according to the trip route it matches; and
   determining whether there are any more retrieved trips to examine.

8. The method for calculating least-cost travel routes as described in claim 7 wherein said calculating an estimate fuel efficiency step further comprises the steps of:
   retrieving a record sorted and stored according to a trip route;
   inputting information from the retrieved record and current trip information into an optimization algorithm and performing fuel efficiency and optimization for the proposed trip based on the retrieved record; and
   storing the result of the optimization algorithm.

9. The method for calculating least-cost travel routes as described in claim 8 further comprising after said storing step, the steps of,
   determining whether there is another record from a set of sorted and stored records; and
   displaying optimization results for records in the set of sorted and stored records when there are no more records in the set.

10. The method for calculating least-cost travel routes as described in claim 8 further comprising after said storing step, the steps of:
- determining whether there is another record from a set of sorted and stored records;
- retrieving a next a sorted and stored record from the set, when there is at least one record still in the set;
- inputting information from the retrieved record and current trip information into an optimization algorithm and performing fuel efficiency and optimization for the proposed trip based on the retrieved record; and
- storing the result of the optimization algorithm.

11. A computer program product in a computer readable storage medium for calculating least-cost travel routes based on fuel efficiency and current traveling conditions comprising:
- instructions for receiving information about a proposed trip;
- instructions for retrieving historical trip data about previous trips having the same or similar characteristics to the proposed trip;
- instructions for prioritizing the retrieved historical data according to historical trips that more closely matched the information of the proposed trip;
- instructions for calculating an estimated fuel efficiency for a proposed trip based on current trip information and information from a historical trip; and
- instructions for conveying this estimated fuel efficiency to a driver.

12. The computer program product for calculating least-cost travel routes as described in claim 11 further comprising before said retrieving historical trip data instructions, instructions for generating a database of historical data about a plurality of trips.

13. The computer program product for calculating least-cost travel routes as described in claim 12 wherein said database generating instructions further comprise instructions for:
- recording trip information for a particular trip at a particular vehicle used in the trip, this information including start and end locations of the trip, distance of the trip, vehicle make and model, time of day and date of the trip;
- calculating performance information for the particular trip, the calculated information including the actual miles per gallon of the vehicle during the particular trip; and
- storing recorded and calculated information about the particular trip in a database location, the information for this particular trip forming one entry in the database.

14. The computer program product for calculating least-cost travel routes as described in claim 11 wherein said prioritizing instructions further comprise instructions for:
- identifying start and end locations for a proposed trip;
- searching a database of historical trip entries for entries having the same or similar start and end locations as the proposed trip;
- storing all historical trip entries having the same or similar start and end locations as the proposed trip;
- identifying from the stored database entries having the same or similar start and end locations as the proposed trip, entries with the same or similar vehicle type as a vehicle to be used in the proposed trip;
- storing the identified entries with the same or similar vehicle type as a vehicle to be used in the proposed trip; and
- identifying from the stored identified entries with the same or similar vehicle type as a vehicle to be used in the proposed trip, entries with the same or similar travel times.

15. The computer program product for calculating least-cost travel routes as described in claim 11 wherein said prioritizing step further comprising instructions for:
- retrieving trips from the database that have the same starting location and destination location of the proposed trip;
- determining two or more alternate trip routes between the trip starting location and the trip destination location from the retrieved data; and
- sorting retrieved historical trip data by alternate trip routes.

16. The computer program product for calculating least-cost travel routes as described in claim 15 wherein said sorting step further comprising instructions for:
- examining a historical trip retrieved from the database;
- matching the retrieved with one of the alternate trip routes;
- storing that record according to the trip route it matches; and
- determining whether there are any more retrieved trips to examine.

17. The computer program product for calculating least-cost travel routes as described in claim 16 wherein said calculating an estimate fuel efficiency step further comprising instructions for:
- retrieving a record sorted and stored according to a trip route;
- inputting information from the retrieved record and current trip information into an optimization algorithm and performing fuel efficiency and optimization for the proposed trip based on the retrieved record; and
- storing the result of the optimization algorithm.

18. A system for calculating least-cost travel routes based on fuel efficiency and current traveling conditions comprising:
- a database containing historical data about trips between various destinations;
- a remote module positioned within a motor vehicle capable of recording and transmitting to the database information about a current trip;
- an optimization algorithm for calculating a fuel efficiency trip information; and
- a display device for displaying fuel efficiency optimization information.

19. The system for calculating least-cost travel routes based on fuel efficiency and current travel conditions as described in claim 18 further comprising a global positioning module.

20. The system for calculating least-cost travel routes based on fuel efficiency and current travel conditions as described in claim 18 further comprising a global communication network, said network providing a means for system components.

* * * * *